(12) United States Patent
Sjolund

(10) Patent No.: US 6,684,809 B1
(45) Date of Patent: Feb. 3, 2004

(54) APPARATUS FOR PERFORMING ANIMAL RELATED OPERATIONS, WITH PROTECTION MEANS, I.E. BREAKER DEVICE

(75) Inventor: Hans Martin Sjolund, Stockholm (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 09/786,400

(22) PCT Filed: Sep. 1, 1999

(86) PCT No.: PCT/SE99/01503

§ 371 (c)(1),
(2), (4) Date: May 8, 2001

(87) PCT Pub. No.: WO00/13495

PCT Pub. Date: Mar. 16, 2000

(30) Foreign Application Priority Data

Sep. 4, 1998 (SE) ................................................ 9802992

(51) Int. Cl.$^7$ .................................................. A01J 3/00
(52) U.S. Cl. ................. 119/14.08; 119/14.1; 119/14.13
(58) Field of Search .......................... 119/14.01–14.55, 119/518, 520

(56) References Cited

U.S. PATENT DOCUMENTS 2,720,837 A * 10/1955 Reeve .......................... 417/37
3,187,719 A * 6/1965 Jones ....................... 119/14.08
3,837,318 A * 9/1974 Duncan et al. .......... 119/14.08
3,991,716 A * 11/1976 Reisgies ................... 119/14.08
4,022,158 A * 5/1977 Flocchini ................. 119/14.14
4,214,553 A * 7/1980 Olander ................... 119/14.08
4,408,564 A * 10/1983 Flocchini ................. 119/14.08
5,069,160 A * 12/1991 Street et al. ............. 119/14.08
5,606,932 A   3/1997 Van Der Lely
5,652,563 A   7/1997 Maus
5,809,931 A * 9/1998 Ellis et al. ............... 119/14.08
5,842,436 A * 12/1998 van der Lely ........... 119/14.08
RE36,391 E * 11/1999 van den Berg et al. ... 119/14.08
6,065,426 A * 5/2000 Olofsson .................. 119/14.08
6,386,141 B1 * 5/2002 Forsen et al. ............ 119/14.08

FOREIGN PATENT DOCUMENTS

EP  0 551 957 A1   7/1993
EP  0 717 926 A1   6/1996

* cited by examiner

*Primary Examiner*—Peter M. Poon
*Assistant Examiner*—Joan M. Olszewski
(74) *Attorney, Agent, or Firm*—Young & Thompson

(57) ABSTRACT

The invention regards an apparatus for performing an animal related operation like milking or grooming, where the animal (9) is confined in a stall (8). In order to protect animals and equipment, it is so arranged that any breaking of the functions activates an activable state, which retracts devices (21; 10) from the region of confinement before the apparatus is allowed to finally stop.

12 Claims, 2 Drawing Sheets

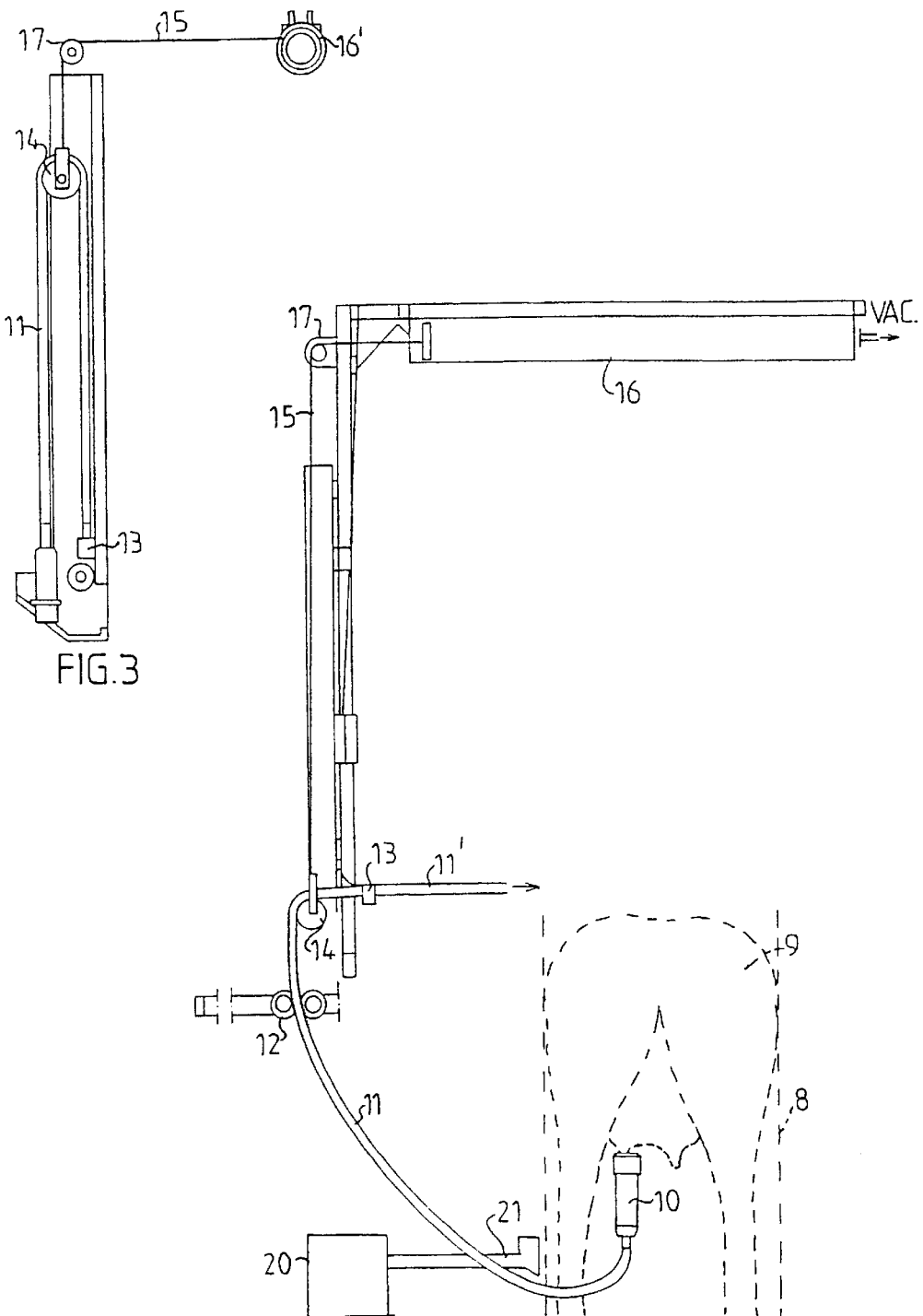

APPARATUS FOR PERFORMING ANIMAL RELATED OPERATIONS, WITH PROTECTION MEANS, I.E. BREAKER DEVICE

TECHNICAL FIELD OF THE INVENTION

The invention regards an apparatus for performing an animal related operation, comprising drive means for moving an animal related device between an active position for operation within an animal stall and an inactive position substantially removed from the animal stall, and comprising a protection means.

A protective device as recited is known from EP-A-0 717 926.

BACKGROUND OF THE INVENTION

The protective device of EP-A-0 717 926 is used together with a milking robot having a robot arm. In its inoperative position, the robot arm is arranged outside the animal stall and in an area attainable and devised for operator presence. This publication is directed to eliminating the dangers for operators when the robot arm may suddenly start to activate itself when an unobservant operator is too near. Therefore, the implement is provided with protection means which prevent a person from approaching the robot arm too closely.

In contrast, the problems addressed by the present invention are security of the animal, hygiene protection and security of the equipment. The operation of an animal related device comprises the entry of an animal into a confinement space, whereafter animal related equipment is brought into action. The animal related operation or activity may comprise various treatments, whereby one of the commonest relates to the milking of milking animals. The term also covers other operations which can be related to milking, like for instance the cleaning of udder and teats, or unrelated thereto, as for instance various grooming operations. An animal is brought or brings itself into a confinement space like an animal stall for an animal related operation, after the performing of which the animal is freed from the animal related equipment, which equipment is brought away from the animal in sufficient degree for enabling the animal to leave the confinement space.

The handling may be fully automatic, semi-automatic or manual in the sense, for instance in the case of a milking operation, that the machinery including teatcups is applied and removed by an operator. In all cases, the animal related operation is performed without or with little human supervision. The inventive problem has to do with what happens or may happen if the procedure is prematurely stopped. An example of this is if the vacuum to teatcups in milking equipment fails or breaks down, in which case the teatcups held by the vacuum will often fall off. As the animal will now want to get out of confinement, it would run a risk by the equipment being left within the confinement area. In order not to incommode or even damage the animal, it would therefore be desirable to ensure that the animal related equipment is not left in the way of the animal after the equipment stops operating and while the animal is still in the confinement area. Secondly, a teatcup which falls to the ground may get dirty when falling on to the ground and bring dirt into the milk. Thirdly, the equipment or part thereof risks to be damaged by the animal.

Also in a case when an operator wants to deactivate an animal related operation in course, a similar situation of leaving hindering paraphernalia within the confinement area is to be avoided for animal security and comfort and other reasons.

The problems can be particularly acute in wholly automated animal related equipment, as the degree of human attendance is then at a minimum, and simultaneously the equipment is more complicated and expensive, and should be protected from being damaged by an animal which wants to get free from a animal related machine which no longer milks. Further, there are also hygienic problems involved. The stopping of vacuum during a animal related operation may make the teatcups fall off, reach the ground and collect dirt. Further, milk may fall to the ground, which is very unhygienic.

Even if the equipment is manually handled or semi-automatic, the loss of vacuum may be sudden and the operator not be quite attentive or may be otherwise occupied, so that the teatcups fall on the floor.

SUMMARY OF THE INVENTION

The problems mentioned above and other problems are solved by the present invention providing an apparatus for performing an animal related operation, comprising drive means for moving an animal related device between an active position for operation within an animal stall and an inactive position substantially removed from the animal stall, and comprising a protection means, in such a way that the protection means comprise a breaker device having an activatable state arranged at each breaking event to first activate said drive means for moving said animal related device into its inactive position and only then inactivating said drive means.

Thus, if there is some kind of malfunction, including the loss of normal electric current, or a breaking by the operator, the equipment will always be brought out of the way into an inactive position before stopping.

The apparatus may advantageously comprise timer means for maintaining energization of said drive means at breaking events for a substantially predetermined time interval for enabling said moving of said animal related device into said inactive position.

This substantially predetermined time interval may be about 2–6 seconds. Such timer means, which may preferentially be hardware rather than software (due to safety regulations) even in case of a computer-based control system, will enable the system to make a two-step breaking operation when a breaking is provoked.

The drive means for moving the animal related equipment may advantageously be pneumatic means powered by a pneumatic power source. The control of valves etc. may however be performed by electromechanical means. In particular, this is advantageous when milking is an operation enabled by the apparatus, since a milking device needs a vacuum source anyhow. It is then very suitable if the apparatus comprises a pneumatic reserve source activatable for moving the animal related equipment into its inactive position in case of inactivation of the pneumatic power source. The loss of vacuum would otherwise be very frustrating for animal and man.

The drive means for moving the said animal related equipment may, however, also be driven from an electric source, either from the normal or commercial power or by another source. For instance, step motors are sometimes very handy and maniable for control purposes, e.g. for a robot. In that case, some reserve energy source is advantageous, like spring means arranged for returning said animal related equipment to its inactive position in case of loss of power from electric source. Various kinds of spring means are envisageable like helical springs on robot arms for linear movements, or spring casings containing spiral springs when rotating movements are needed. It is also possible to provide battery power in the event of loss of a normal or commercial electric source.

When milking is included in the animal related operation, teatcups of the said animal related equipment may be individually mounted for individual mounting and retraction. The teatcups may then be such that are installed by hand, or they may be mounted by a robot arm. It is then very advantageous if each teatcup is provided with an individual tube means connecting it to further animal related equipment substantially outside the animal related stall, and with individual puller devices powered by said drive means for a sideways retraction of a connected teatcup, which retraction is sufficiently rapid for avoiding the respective teatcup from touching the floor. In an advantageous embodiment, the teatcups may then, at the moment of retraction, be made subject of a short suction via the tube means, for taking care of an amount of milk in the teatcup and for avoiding its spilling on the floor. The animal related device comprises anyone of a teat cleaning means, a teat after-treatment means and a teatcup for milking an animal. Thus, the same problem of leaving an animal confined in a stall together with a more or less bulky, inoperative and embarrassing device exists regardless of the kind of animal related operation which was under performing. The animal may be annoyed and even hurt, and the device may get hurt.

When the device comprises teatcups, they may be individually mounted for individual mounting and retraction. In manual machine milking, the teatcups are connected to a head, in its turn connected to equipment outside the animal stall. It is advantageous, when the teatcups can be automatically drawn off if there is a loss of driving-power. Especially if many animals are being milked at the same time under the surveillance of one or very few operators, the advantage is evident.

Also in semi-automatic and automatic milking devices, the same is true. The teat-cups should be drawn off by retraction means. The retraction means may be individual for each teatcup, if there is a connection tube for each teatcup but if they are connected to a head at short distance and a common connexion tube connects to the animal related equipment outside the stall, the drawing away may be made by a common retraction means. The head may sometimes be joined to a robot arm, the retraction of which will perform the desired function. The retraction means should perform the retraction sufficiently rapidly for avoiding that a teatcup falls to the floor and gets dirty.

The animal related equipment may comprise a retractable robot arm. This is the case both when the arm, as a robot arm, handles the teatcups one by one when mounting them, and when the teatcups are mounted on the robot arm with possibly short tube means, and the removal of the teatcups Was made as the robot arm is retracted from under the animal'udder. By this inventive means, it is assured that regardless of the nature and reason for the breaking of the animal related proceeding, the arm will be drawn out of the animal related stall.

The breaking events may be of various kinds. One representative case is when an operator for some reason finds that the operation should be immediately stopped. The animal may be making noises of dissatisfaction, the reasons of which must be investigated. Another is the loss of main current.

DRAWING SUMMARY

The invention shall now be described in the form of an exemplary embodiment and in relation to the figures.

FIG. 2 is an exemplary embodiment where the animal related operation is milking and shows the general environment for an exemplary robot milking device.

FIG. 3 shows a detail of a teatcup retractor.

DETAILED DESCRIPTION

Figure 1:
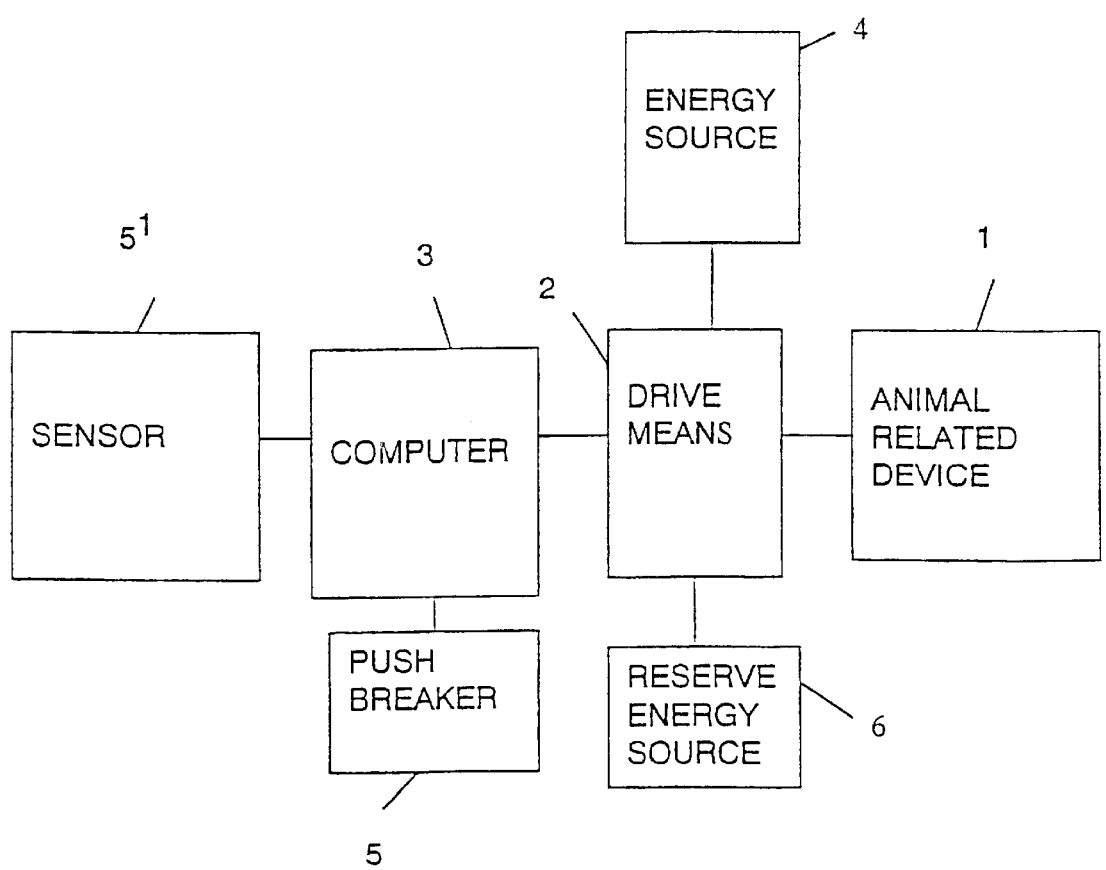
FIG. 1 is a block schematic drawing of an embodiment of the invention.

In FIG. 1 is shown a block diagram for an apparatus for performing an animal related operation, in an automatic version. The animal related device may be one of several possible operations which may be performed, like grooming an animal, cleaning its teats before milking, milking, etc. This animal related device is driven by drive means 2 under the control of a computer 3 and receives energy from an energy source 4. In performing its ordinary duties, it may happen that the function is broken, either voluntarily because an operator actuates a push breaker 5, or because of other reasons, e.g. that the computer finds a situation motivating a corresponding action. The computer may have access to sensor signals from a sensor 5' working as a breaker means and which senses a significant environment condition. One such condition may be when an animal which is subjected to the animal related device makes sounds of distress. Another may be the failing of the energy source, in which case a reserve energy source of possibly low capacity will have to carry out a liberating action.

According to the invention, thus, whenever such a breaking event occurs, the computer will make the drive means move the animal related device into an inactive position.

In FIG. 2, the invention is exemplified by a milking operation being the animal relating operation, and with the animal being a cow. In an animal stall is confined a cow 9, which is being milked by a teatcup 10 which is connected via tube means 11 and 11' to milking equipment of a known type. The tube means comprise leads for milk and for applying vacuum to the teatcup 10. Although only one teatcup is shown, in order to obtain greater clarity, the number of teatcups for a cow would normally be four (and for some milking animals only two). In this embodiment, the teatcups 10 are mounted by a robot arm 20, 21 with a portion 21 which then enters into the stall 8.

If for some reason, the energy source falls, the vacuum may vanish. If this happens, the teatcups will fall off, in which case the cow will anyhow want to liberate herself, as there is no further milking action. The teatcups thus risk falling off, landing on the floor and catching dirt. The invention avoids this, by seeing to it that the teatcups, which here form part of the animal related device, are carried away. This is obtained in the following way.

When the computer 3 (FIG. 1) finds that the operation should be discontinued, the drive means 2 are activated for drawing away the teatcups 10. This is done by drawing in the tube means 11 fast enough so that the teatcups do not fall to the ground. This is made by means of the drawing up of pulley 14, over which the tube means 11 is laid and fixed at 13. Steering means 12 in he form of two rollers stabilize the rolling up. Pulley 14 is drawn up by string means 15, which is led over a fixed pulley 17 to a vacuum activated cylinder 16. In FIG. 3 is shown a varied form of device, different in that instead of a pneumatic cylinder 16 as in FIG. 2, there is shown a pneumatically driveable motor 16 which winds up the string means 15. Thus, the pulley 14 in its high position will have drawn in an amount of the tube means 11 corresponding to twice the height difference for pulley 14.

It is preferred, when retracting the teat cup, also to make a sucking action of some force in the milk tube portion of tube means 11 at the moment of drawing the teatcups loose from the teats. The risk of spilling milk is the heavily reduced, which is a great advantage, as milk is very prone to bacterial infection and in fact worse than manure as to infecting milk.

The above Example relates to automatic and semi-automatic milking, but it is clear that the same problem may exist also when confined animals are milked manually by means of milking machines, manually in the sense that the teatcups are mounted manually one by one and normally also removed manually by an operator, who may be catering to many animals at the same time. Also in that case, it may happen that the equipment stops, and where such a breaking event happens, it will normally regard all the animals being milked. To have protection means according to the invention, for drawing out the animal related device in form of the teatcups, normally connected to a collector device connected to tube means connecting to related equipment, in order to eliminate it from the confined space is a certain advantage even in the entirely manual case.

Also, the animal related device may be other than milking equipment, for example grooming or cleaning equipment.

If a robot arm 21 happens to be within the confinement 8 at the movement of a breaking event, it should also be retracted. In some cases, the teatcups are solidary with the robot arm end entered in the confinement 8, the retraction of the teatcup s is made in fact by retracting the robot arm (not shown). Also in this case, it is preferred to make a sucking when the teatcups are liberated, in order to avoid spilling of milk.

Although the invention has been exemplified by a cow to be milked, it is clear that the invention is neither limited to milking, nor to cows, as there are other milking animals like goats, sheep, yaks, horses and buffaloes, the milk of which have human use.

What is claimed is:

1. An apparatus for performing an animal related operation, comprising:
    animal related equipment having drive means for moving an animal related device between an active position for operation within an animal stall (8) and an inactive position substantially removed from the animal stall,
    the animal related equipment comprising a protection means,
    the protection means comprising a breaker device having an activatable state programmed at each breaking event to first activate said drive means for automatically moving said animal related device into its inactive position and only then inactivate said drive means, wherein,
    said animal related equipment is a milking apparatus operated with vacuum teatcups,
    said protection means, at each breaking event, automatically activates said drive means to automatically move the teatcups from an active position to an inactive position, and
    vacuum suction is maintained as the teatcups are retracted, the milking apparatus being shut off only after the teatcups are in their inactive position.

2. An apparatus according to claim 1, characterized by timer means for maintaining energization of said drive means at breaking events for substantially predetermined time interval for enabling said moving of said animal related device into said inactive position.

3. An apparatus according to claim 2, characterized in that said substantially predetermined time interval is 2–6 seconds.

4. An apparatus according to claim 1, characterized in that the drive means (16; 16') for moving the animal related equipment are pneumatic means powered by a pneumatic power source.

5. An apparatus according to claim 4, characterized in comprising a pneumatic reserve source (6) activatable for moving said animal related device into its inactive position in case of inactivation of said pneumatic power source.

6. An apparatus according to claim 1, characterized in that the drive means for moving the said animal related device are driven from the electric source.

7. An apparatus according to claim 6, characterized in that spring means are arranged for returning said animal related device to its inactive position in case of loss of power from said electric source.

8. An apparatus according to claim 6, characterized in that battery means (6) are provided in the event of loss of a mains electric source having caused a breaking event.

9. An apparatus according to claim 1, characterized in that the animal related device comprises anyone of a teat cleansing means, a teat after-treatment means and a teatcup (10) for milking an animal.

10. An apparatus according to claim 9, characterized in that teatcups of the said animal related device are individually mounted for individual mounting and retraction.

11. An apparatus according to claim 10, characterized in that a said teatcup (10) is provided with means connecting it to further animal related equipment substantially outside the animal related stall, comprising retraction means (15) connected to a puller device powered by said drive means for a sideways retraction of a connected teatcup (10) which retraction is sufficiently rapid for avoiding the respective teatcup from touching the floor.

12. An apparatus according to claim 1, characterized in that the said animal related equipment comprises a retractable robot arm (20, 21).

* * * * *